United States Patent
Tanaka et al.

(10) Patent No.: US 11,437,627 B2
(45) Date of Patent: Sep. 6, 2022

(54) METAL ADSORBENT-CARRYING CARBON MATERIAL, POSITIVE ELECTRODE MATERIAL FOR LITHIUM ION SECONDARY BATTERIES, POSITIVE ELECTRODE FOR LITHIUM ION SECONDARY BATTERIES, AND LITHIUM ION SECONDARY BATTERY

(71) Applicant: Sumitomo Metal Mining Co., Ltd., Tokyo (JP)

(72) Inventors: Shinichi Tanaka, Tokyo (JP); Tsutomu Nozoe, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 17/212,962

(22) Filed: Mar. 25, 2021

(65) Prior Publication Data

US 2022/0020999 A1    Jan. 20, 2022

(30) Foreign Application Priority Data

Jul. 16, 2020 (JP) .............................. JP2020-122262

(51) Int. Cl.
| | | |
|---|---|---|
| *H01M 4/62* | (2006.01) | |
| *H01M 4/136* | (2010.01) | |
| *H01M 4/58* | (2010.01) | |
| *H01M 4/36* | (2006.01) | |
| *H01M 10/0525* | (2010.01) | |
| *B01J 20/02* | (2006.01) | |
| *B01J 20/20* | (2006.01) | |
| *B01J 20/28* | (2006.01) | |
| *B01J 20/32* | (2006.01) | |
| *H01M 4/02* | (2006.01) | |

(52) U.S. Cl.
CPC ......... *H01M 4/628* (2013.01); *B01J 20/0229* (2013.01); *B01J 20/205* (2013.01); *B01J 20/28019* (2013.01); *B01J 20/28023* (2013.01); *B01J 20/3204* (2013.01); *B01J 20/3236* (2013.01); *H01M 4/136* (2013.01); *H01M 4/366* (2013.01); *H01M 4/5825* (2013.01); *H01M 4/625* (2013.01); *H01M 10/0525* (2013.01); *B01J 2220/42* (2013.01); *H01M 2004/028* (2013.01)

(58) Field of Classification Search
CPC ........... H01M 10/052; H01M 10/0525; H01M 2004/028; H01M 4/136; H01M 4/362; H01M 4/364; H01M 4/366; H01M 4/5825; H01M 4/62; H01M 4/625; H01M 4/628

See application file for complete search history.

(56) References Cited

U.S. PATENT DOCUMENTS

2007/0202411 A1    8/2007   Kim et al.

FOREIGN PATENT DOCUMENTS

| JP | 2003-126846 A | | 5/2003 |
|---|---|---|---|
| JP | 2006107763 A | * | 4/2006 |
| JP | 2009-527089 A | | 7/2009 |
| JP | 5507083 B | | 5/2014 |
| KR | 10-2016-0114883 A | | 10/2016 |

OTHER PUBLICATIONS

Office Action for Japanese Patent Application No. 2020-122262 (dated Apr. 6, 2021).

Peng X et al., "Carbon nanotubes-iron oxides magnetic composites as adsorbent for removal of Pb(II) and Cu(II) from water", Carbon, Elsevier Oxford, GB, vol. 43, No. 4: 880-883 (2004).

Search Report for European Application No. 21162093.5 (dated Aug. 25, 2021).

* cited by examiner

*Primary Examiner* — Carlos Barcena
(74) *Attorney, Agent, or Firm* — Merchant & Gould P.C.

(57) ABSTRACT

A metal adsorbent-carrying carbon material for a positive electrode for lithium ion secondary batteries including a carbon material; and a metal adsorbent which is supported on the carbon material, wherein the metal adsorbent is a material which can adsorb iron ions ($Fe^{2+}$, $Fe^{3+}$).

5 Claims, No Drawings

METAL ADSORBENT-CARRYING CARBON MATERIAL, POSITIVE ELECTRODE MATERIAL FOR LITHIUM ION SECONDARY BATTERIES, POSITIVE ELECTRODE FOR LITHIUM ION SECONDARY BATTERIES, AND LITHIUM ION SECONDARY BATTERY

CROSS-REFERENCE TO RELATED APPLICATIONS

This application claims the benefit of Japanese Patent Application No. 2020-122262 filed Jul. 16, 2020, the disclosure of which is herein incorporated by reference in its entirety.

BACKGROUND OF THE INVENTION

Field of the Invention

The present invention relates to a metal adsorbent-carrying carbon material, a positive electrode material for lithium ion secondary batteries, a positive electrode for lithium ion secondary batteries, and a lithium ion secondary battery.

Description of Related Art

In a lithium ion secondary battery, in a case where an iron-containing material is used as a positive electrode material, iron ions are eluted from the positive electrode material into an electrolyte. Iron ions are transferred to a negative electrode side along with the driving of the battery. The iron ions transferred to the negative electrode side are reduced on the negative electrode surface to form iron. As a result, iron is deposited on the negative electrode surface, and cycle characteristics of the battery deteriorate.

In the related art, a method of suppressing elution of iron ions from a positive electrode material is considered.

For example, a method of improving crystallinity of lithium phosphate particles to suppress elution of iron from the lithium phosphate particles is known.

In addition, a method of coating a surface of a positive electrode active material with carbon to suppress elution of iron from the positive electrode active material is known.

Further, a method of mixing a chelating agent with an electrolyte and collecting iron ions eluted from a positive electrode material with the chelating agent is known (for example, refer to Japanese Patent No. 5507083).

SUMMARY OF THE INVENTION

However, in the method of improving crystallinity of lithium phosphate particles, it is difficult to completely suppress elution of iron.

In addition, when a surface of a positive electrode active material is completely coated with carbon, the thickness of the carbonaceous film increases.

When the thickness of the carbonaceous film increases, which affects transfer of lithium ions. Therefore, properties deteriorate.

Further, in the method of collecting iron ions with the chelating agent, the chelating agent in the electrolyte moves to the negative electrode side during the driving of the battery and is deposited on the negative electrode surface to suppress deposition of iron. On the other hand, however, the chelating agent inhibits the transfer of electrons and lithium ions.

The present invention has been made in consideration of the above-described circumstances, and an object thereof is to provide a metal adsorbent-carrying carbon material that can suppress iron ions eluted from a positive electrode material from being deposited on a negative electrode surface without inhibiting transfer of electrons and lithium ions, a positive electrode material for lithium ion secondary batteries including the metal adsorbent-carrying carbon material, a positive electrode for lithium ion secondary batteries including the positive electrode material for lithium ion secondary batteries, and a lithium ion secondary battery including the positive electrode for lithium ion secondary batteries.

In order to achieve the object, according to the first aspect of the present invention, there is provided a metal adsorbent-carrying carbon material including: a carbon material; and a metal adsorbent which is supported on the carbon material.

In the above aspect of the present invention, it is preferable that the carbon material is at least one selected from the group consisting of carbon black, carbon nanotube, and activated carbon.

In the above aspect of the present invention, the metal adsorbent may be iron oxyhydroxide.

In the above aspect of the present invention, a content of a metal element may be 0.01 mol % or more and 10 mol % or less with respect to a content of the carbon material.

According to the second aspect of the present invention, there is provided a positive electrode material for lithium ion secondary batteries including: an olivine type positive electrode active material coated with a carbonaceous film; and the metal adsorbent-carrying carbon material according to the aspect of the present invention.

In the above aspect of the present invention the olivine type positive electrode active material may be represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, and Y, $0.9 < x < 1.1$, $0 < y \leq 1$, $0 \leq z < 1$, and $0.9 < y+z < 1.1$).

According to the third aspect of the present invention, there is provided a positive electrode for lithium ion secondary batteries including: an electrode current collector; and a positive electrode mixture layer which is formed on the electrode current collector, in which the positive electrode mixture layer includes the positive electrode material for lithium ion secondary batteries according to the aspect of the present invention.

According to the fourth aspect of the present invention, there is provided a lithium ion secondary battery including: a positive electrode; a negative electrode; and a non-aqueous electrolyte, in which the positive electrode for lithium ion secondary batteries according to the aspect of the present invention is provided as the positive electrode.

The present invention can provide a metal adsorbent-carrying carbon material that can suppress iron ions eluted from a positive electrode material from being deposited on a negative electrode surface without inhibiting transfer of electrons and lithium ions, a positive electrode material for lithium ion secondary batteries including the metal adsorbent-carrying carbon material, a positive electrode for lithium ion secondary batteries including the positive electrode material for lithium ion secondary batteries, and a lithium ion secondary battery including the positive electrode for lithium ion secondary batteries.

DETAILED DESCRIPTION OF THE INVENTION

Suitable examples of an embodiment of a metal adsorbent-carrying carbon material, a positive electrode material for lithium ion secondary batteries, a positive electrode for lithium ion secondary batteries, and a lithium ion secondary battery according to the present invention will be described below.

The embodiment will be described in detail for easy understanding of the concept of the present invention, but the present invention is not limited thereto unless specified otherwise. For example, materials, ratios, values, amounts, positions, kinds, numbers, and the like may be changed, added, or omitted as necessary.

Metal Adsorbent-Carrying Carbon Material

The metal adsorbent-carrying carbon material according to the embodiment includes: a carbon material; and a metal adsorbent that is supported on the carbon material. In other words, the metal adsorbent-carrying carbon material according to the embodiment includes: a carbon material; and a metal adsorbent that is attached to the carbon material. The carbon material in the metal adsorbent-carrying carbon material according to the embodiment is primary particles.

Examples of a shape of the metal adsorbent-carrying carbon material according to the embodiment include a spherical shape, an elliptical spherical shape, a plate shape, and a layer shape.

The metal adsorbent-carrying carbon material according to the embodiment is primary particles. In a case where the carbon material is carbon black described below, an average primary particle diameter of the metal adsorbent-carrying carbon material according to the embodiment is preferably 10 nm or more and 100 nm or less, more preferably 13 nm or more and 80 nm or less, and still more preferably 15 nm or more and 60 nm or less. The average primary particle diameter may be 30 nm or more and 70 nm or less, 40 nm or more and 65 nm or less, 45 nm or more and 55 nm or less, or the like. In a case where the carbon material is carbon nanotube described below, an average primary particle diameter of the metal adsorbent-carrying carbon material according to the embodiment is preferably 1 µm or more and 100 µm or less, more preferably 2 µm or more and 70 µm or less, and still more preferably 3 µm or more and 50 µm or less. The average primary particle diameter may be 1 µm or more and 30 µm or less, 1 µm or more and 25 µm or less, or the like. In a case where the carbon material is activated carbon described below, an average primary particle diameter of the metal adsorbent-carrying carbon material according to the embodiment is preferably 1 µm or more and 200 µm or less and more preferably 2 µm or more and 150 µm or less. The average primary particle diameter may be 1 µm or more and 80 µm or less, 1 µm or more and 30 µm or less, 1 µm or more and 10 µm or less, 1 µm or more and 5 µm or less, or the like.

The average primary particle diameter of the metal adsorbent-carrying carbon material can be obtained by randomly selecting 100 primary particles, measuring the length of the longest side of each of the primary particles with a scanning electron microscope (SEM), and obtaining the average value thereof.

Carbon Material

The carbon material is not particularly limited and is at least one selected from the group consisting of carbon black, carbon nanotube, and activated carbon.

The carbon black is not particularly limited as long as it satisfies the following ranges of the average primary particle diameter or the specific surface area. Specific examples of the carbon black include #3030B (trade name) manufactured by Mitsubishi Chemical corporation, #3350B (trade name) manufactured by Mitsubishi Chemical corporation, TOKABLACK #5500 (trade name) manufactured by Tokai Carbon Co., Ltd., TOKA BLACK #4300 (trade name) manufactured by Tokai Carbon Co., Ltd., DENKA BLACK FX-35 (trade name) manufactured by Denka Co., Ltd., and DENKA BLACK HS-100 (trade name) manufactured by Denka Co., Ltd.

The average primary particle diameter of the carbon black is preferably 10 nm or more and 100 nm or less and more preferably 15 nm or more and 60 nm or less.

The average primary particle diameter of the carbon black can be obtained by randomly selecting 100 primary particles, measuring the length of the longest side of each of the primary particles with a scanning electron microscope (SEM), and obtaining the average value thereof.

A specific surface area of primary particles of the carbon black is preferably 10 m$^2$/g or more and 300 m$^2$/g or less and more preferably 25 m$^2$/g or more and 250 m$^2$/g or less. The specific surface area may be, for example, 50 m$^2$/g or more and 200 m$^2$/g or less, 100 m$^2$/g or more and 150 m$^2$/g or less, or the like.

The specific surface area of the primary particles of the carbon black is measured using a specific surface area meter with a BET method using nitrogen ($N_2$) adsorption.

The carbon nanotube is not particularly limited as long as it satisfies the following ranges of the diameter or the length. Specific examples of the carbon nanotube include HCNTs2 (trade name) manufactured by Shima Trading Co., Ltd., HCNTs10 (trade name) manufactured by Shima Trading Co., Ltd., CNTs20 (trade name) manufactured by Shima Trading Co., Ltd., 0550CA (trade name, single-walled CNT) manufactured by Corefront Corporation), 0550CA-OH (trade name, single-walled CNT+OH Functionalized) manufactured by Corefront Corporation, 0552CA-OH (trade name, multiwalled CNT+OH Functionalized) manufactured by Corefront Corporation, and 0550CA-COOH (trade name, single-walled CNT+COOH Functionalized) manufactured by Corefront Corporation.

The diameter of the carbon nanotube is preferably 0.1 nm or more and 200 nm or less and more preferably 0.5 nm or more and 150 nm or less.

The diameter of the carbon nanotube can be measured using a scanning electron microscope (SEM).

The length of the carbon nanotube is preferably 1 µm or more and 100 µm or less and more preferably 3 µm or more and 50 µm or less.

The length of the carbon nanotube can be measured using a scanning electron microscope (SEM).

The activated carbon is not particularly limited as long as it satisfies the following ranges of the diameter (mesh). Specific examples of the activated carbon include PK (trade name) for decolorization purification manufactured by Kuraray Co., Ltd., UCGCPS (trade name) manufactured by UES Co., Ltd., and UCG-NP (trade name) manufactured by UES Co., Ltd.

The diameter (mesh) of the activated carbon is preferably 200 µm or less and more preferably 150 µm or less.

The diameter (mesh) of the activated carbon can be measured by classification using a standard sieve. In addition, the diameter of the activated carbon that is crushed to have a small diameter can be obtained by measuring the length of the longest side of each of primary particles with a scanning electron microscope (SEM) and obtaining the average value thereof.

Among these carbon materials, one kind may be used alone, or two or more kinds may be used in combination.

Metal Adsorbent

The metal adsorbent is not particularly limited as long as it can adsorb iron ions ($Fe^{2+}$, $Fe^{3+}$), and examples thereof include iron oxyhydroxide, iron hydroxide, and calcium phosphate. Among these, iron oxyhydroxide is preferable from the viewpoint of excellent affinity to iron ions. Among them, one kind may be used alone, or two or more kinds may be used in combination.

The iron oxyhydroxide is obtained by crystallization of ferric hydroxide and is a mixture of α-iron oxyhydroxide (α-FeOOH), β-iron oxyhydroxide (β-FeOOH), γ-iron oxyhydroxide (γ-FeOOH), and δ-iron oxyhydroxide (δ-FeOOH). The iron oxyhydroxide is stably present in a state where it is supported on the carbon material.

It is preferable that the iron oxyhydroxide is spherical crystal, plate crystal, and/or the like.

The particle diameter of the iron oxyhydroxide is preferably 5 nm or more and 500 nm or less, more preferably 10 nm or more and 400 nm or less, and still more preferably 15 nm or more and 300 nm or less. The particle diameter may be, for example, 30 nm or more and 100 nm or less, 50 nm or more and 80 nm or less, or the like.

A method of producing the iron oxyhydroxide will be described.

A method of producing the iron oxyhydroxide according to the embodiment preferably includes: a step of mixing a predetermined amount of surface-activated carbon black particles with a predetermined amount of iron (III) nitrate nonahydrate dissolved in pure water to prepare a suspension; a step of adding a sodium hydroxide aqueous solution to the suspension under stirring to neutralize the suspension; a step of heating the neutralized suspension at 60° C. for 72 hours; and a step of filtering the heated suspension, cleaning the separated (collected) particles, and drying the cleaned particles.

In the metal adsorbent-carrying carbon material according to the embodiment, the content of the metal adsorbent is represented by the content of a metal element. In the metal adsorbent-carrying carbon material according to the embodiment, the content of the metal element is preferably 0.01 mol % or more and 10 mol % or less, more preferably 0.03 mol % or more and 7 mol % or less, and still more preferably 0.05 mol % or more and 5 mol % or less. When the content of the metal element is less than the aforementioned lower limit value, the iron ion adsorption performance is not sufficient. On the other hand, when the content of the metal element is more than the aforementioned upper limit value, the supporting amount of the metal element on the carbon material surface may be excessively large, and the metal element may be separated from the carbon material surface. The aforementioned content of the metal element may be 0.05 mol % or more and 15 mol % or less, 0.05 mol % or more and 13 mol % or less, 1.0 mol % or more and 8 mol % or less, or the like, as necessary.

In a case where the metal adsorbent is iron oxyhydroxide, the content of the iron oxyhydroxide in the metal adsorbent-carrying carbon material according to the embodiment is represented by the content of iron (Fe).

In a case where the carbon material is carbon black, the content of the iron oxyhydroxide in the metal adsorbent-carrying carbon material according to the embodiment is 0.05 mol % or more and 10 mol % or less in terms of Fe.

In a case where the carbon material is carbon nanotube, the content of the iron oxyhydroxide in the metal adsorbent-carrying carbon material according to the embodiment is 0.1 mol % or more and 5 mol % or less in terms of Fe.

In a case where the carbon material is activated carbon, the content of the iron oxyhydroxide in the metal adsorbent-carrying carbon material according to the embodiment is 0.1 mol % or more and 5 mol % or less in terms of Fe.

The metal adsorbent-carrying carbon material according to the embodiment includes: a carbon material; and a metal adsorbent that is supported on the carbon material. Therefore, in a case where the metal adsorbent-carrying carbon material is used as a positive electrode material, iron ions eluted from a positive electrode material can be suppressed from being deposited on a negative electrode surface without inhibiting transfer of electrons and lithium ions.

For example, in a case where the metal adsorbent is iron oxyhydroxide, hydrogen of a hydroxyl group in the iron oxyhydroxide is substituted with iron ions eluted from the positive electrode material, and the iron ions are adsorbed on the metal adsorbent-carrying carbon material.

Method of Producing Metal Adsorbent-Carrying Carbon Material

A method of producing the metal adsorbent-carrying carbon material according to the embodiment includes a step of causing the carbon material to support the metal adsorbent. The method of producing the metal adsorbent-carrying carbon material according to the embodiment may include a step of performing a surface activation treatment on the carbon material before the step of causing the carbon material to support the metal adsorbent.

Surface Activation Treatment Step of Carbon Material (Step A)

In the step A, a treatment improving surface activity of the carbon material in advance to cause the carbon material to support the metal adsorbent.

Sulfuric acid is slowly added to nitric acid, the obtained mixture is cooled to room temperature (25° C.), and the cooled mixture is dissolved in potassium permanganate to prepare a surface treatment solution.

A mixing ratio between sulfuric acid and nitric acid is preferably 5:1 or more and 1:5 or less by mass ratio (sulfuric acid:nitric acid).

The addition amount of potassium permanganate with respect to 100 parts by mass of the mixture is preferably 3 parts by mass and 20 parts by mass.

Next, the carbon material is dipped in the surface treatment solution and is kept at room temperature (25° C.) for 0.5 hours to 5 hours.

The addition amount of the carbon material with respect to 100 parts by mass of the surface treatment solution is preferably 1 part by mass or more and 30 parts by mass or less.

Next, the surface treatment solution including the carbon material is added to pure water and is left to stand for 0.5 hours or longer and 5 hours or shorter.

The addition amount of pure water with respect to 100 parts by mass of the surface treatment solution including the carbon material is preferably 100 part by mass or more and 500 parts by mass or less.

Further, a hydrogen peroxide solution is added to the surface treatment solution including the carbon material until the surface treatment solution including the carbon material is transparent and bubbles are not formed.

After the bubbles are not formed, the carbon material in the surface treatment solution is filtered, and the collected carbon material is cleaned with pure water.

Next, the cleaned carbon material is dipped in an aqueous solution in which 0.5 g of sodium borohydride is dissolved in 0.1 mol/L of a sodium hydroxide aqueous solution, and a heat treatment is performed at 90° C. for 0.5 hours or longer and 24 hours or shorter.

Next, the carbon material in the aqueous solution is filtered and is cleaned with pure water to obtain the carbon material on which the surface activation treatment is performed.

Step of Causing Carbon Material to Support Metal Adsorbent (Step B)

The carbon material on which the surface activation treatment is performed is mixed with an iron (III) nitrate aqueous solution in which iron (III) nitrate nonahydrate is dissolved in pure water. As a result, a suspension is prepared.

The content of the iron (III) nitrate nonahydrate dissolved in pure water is preferably 0.1 mol % or more and 5 mol % or less in terms of Fe.

Next, a sodium hydroxide aqueous solution is added to the suspension under stirring to neutralize the suspension.

The concentration of the sodium hydroxide aqueous solution is preferably 0.1 mol/L or more and 10 mol/L or less.

Next, a heat treatment is performed on the neutralized suspension at 60° C. for 6 hours or longer and 72 hours or shorter.

Next, the carbon material in the suspension is filtered, is cleaned with pure water, is dried at 100° for 6 hours or longer and 36 hours or shorter to obtain the carbon material on which iron oxyhydroxide is supported (metal adsorbent-carrying carbon material).

Positive Electrode Material for Lithium Ion Secondary Batteries

The positive electrode material for lithium ion secondary batteries according to the embodiment includes: an olivine type positive electrode active material coated with a carbonaceous film (hereinafter, referred to as "carbon-coated positive electrode active material"); and the metal adsorbent-carrying carbon material according to the embodiment. That is, the positive electrode material for lithium ion secondary batteries according to the embodiment is a mixture of the carbon-coated positive electrode active material and the metal adsorbent-carrying carbon material according to the embodiment.

In the positive electrode material for lithium ion secondary batteries according to the embodiment, a mixing ratio between the carbon-coated positive electrode active material and the metal adsorbent-carrying carbon material is preferably 100:0.1 to 100:5, more preferably 100:0.1 to 100:3 by mass ratio, and still more preferably 100:0.2 to 100:3 by mass ratio, and particularly preferably 100:0.2 to 100:0.5.

The positive electrode material for lithium ion secondary batteries according to the embodiment may included the carbon-coated positive electrode active material including: primary particles of the positive electrode active material; primary particles of the metal adsorbent-carrying carbon material; and the carbonaceous film (pyrolytic carbonaceous film) with which surfaces of at least either the primary particles of the positive electrode active material and the primary particles of the metal adsorbent-carrying carbon material and surfaces of the secondary particles (the mixture of the positive electrode active material and the metal adsorbent-carrying carbon material) are coated. In addition, the positive electrode material for lithium ion secondary batteries according to the embodiment includes a granulated body obtained by granulating primary particles of the carbon-coated positive electrode active material.

The thickness of the carbonaceous film with which the surfaces of the secondary particles are coated is measured, for example, using a transmission electron microscope (TEM) or an energy dispersive X-ray microanalyzer (EDX).

In the positive electrode material for lithium ion secondary batteries according to the embodiment, the thickness of the carbonaceous film with which the surfaces of the primary particles of the positive electrode active material are coated is preferably 1 nm or more and 20 nm or less and more preferably 2 nm or more and 10 nm or less. When the thickness of the carbonaceous film with which the surfaces of the primary particles are coated is the lower limit value or more, the total transfer resistance of electrons in the carbonaceous film can be suppressed from increasing. As a result, an increase in the internal resistance of the lithium ion battery can be suppressed, and a decrease in voltage at a high charge-discharge rate can be prevented. On the other hand, when the thickness of the carbonaceous film with which the surfaces of the primary particles are coated is the upper limit value or less, the formation of steric hindrance hindering diffusion of lithium ions in the carbonaceous film can be suppressed, and this the transfer resistance of lithium ions decreases. As a result, an increase in the internal resistance of the battery can be suppressed, and a decrease in voltage at a high charge-discharge rate can be prevented.

The thickness of the carbonaceous film with which the surfaces of the primary particles of the positive electrode active material are coated is measured, for example, using a transmission electron microscope (TEM) or an energy dispersive X-ray microanalyzer (EDX).

In the positive electrode material for lithium ion secondary batteries according to the embodiment, the average particle diameter of the primary particles of the carbon-coated positive electrode active material is preferably 50 nm or more and 500 nm or less and more preferably 70 nm or more and 450 nm or less. When the average primary particle diameter of the carbon-coated positive electrode active material is the lower limit value or more, an increase in the amount of carbon caused by an excessive increase in the specific surface area can be suppressed. On the other hand, when the average primary particle diameter of the carbon-coated positive electrode active material is the upper limit value or less, electron conductivity and ion diffusion performance can be improved due to the large specific surface area.

In the positive electrode material for lithium ion secondary batteries according to the embodiment, the specific surface area of the carbon-coated positive electrode active material is preferably 5 $m^2/g$ or more and 25 $m^2/g$ or less and more preferably 7 $m^2/g$ or more and 20 $m^2/g$ or lower. When the specific surface area of the carbon-coated positive electrode active material is the lower limit value or more, the diffusion rate of lithium ions in the positive electrode material can be improved, and the battery characteristics of the lithium ion secondary battery can be improved. On the other hand, when the specific surface area of the carbon-coated positive electrode active material is the upper limit value or less, the electron conductivity can be improved.

In the positive electrode material for lithium ion secondary batteries according to the embodiment, the average particle diameter of the granulated body obtained by granulating the primary particles of the carbon-coated positive electrode active material is preferably 0.5 μm or more and 20 μm or less and more preferably 1.0 μm or more and 18 μm or less. In a case where the average particle diameter of the granulated body is the lower limit value or more, when the positive electrode material, a conductive auxiliary agent, a binder resin (binder), and a solvent are mixed with each other to prepare a positive electrode material paste for lithium ion secondary batteries, the mixing amount of the conductive auxiliary agent and the mixing amount can be reduced, and the battery capacity of the lithium ion secondary battery per unit mass of the positive electrode mixture layer for lithium ion secondary batteries can be increased. On the other hand, when the average particle diameter of the granulated body is the upper limit value or more, the dispersibility and uniformity of the conductive auxiliary agent or the binder in the positive electrode mixture layer for lithium ion secondary batteries can be improved. As a result, in the lithium ion secondary battery including the positive electrode material for lithium ion secondary batteries according to the embodiment, the discharge capacity at a high-speed charge and discharge can be increased.

The average particle diameter of the granulated body is measured using a laser diffraction particle diameter analyzer after suspending the positive electrode material for lithium ion secondary batteries according to the embodiment in a dispersion medium in which 0.1% by mass of polyvinyl pyrrolidone is dissolved in water.

In the positive electrode material for lithium ion secondary batteries according to the embodiment, the carbon content in the primary particles of the carbon-coated positive electrode active material is preferably 0.5% by mass or more and 7% by mass or less and more preferably 0.7% by mass or more and 5% by mass or less. When the carbon content in the primary particles of the carbon-coated positive electrode active material is the lower limit value or more, the electron conductivity can be sufficiently improved. On the other hand, when the carbon content in the primary particles of the carbon-coated positive electrode active material is the upper limit value or less, the electrode density can be improved.

The carbon content in the primary particles of the carbon-coated positive electrode active material is measured using a carbon analyzer (carbon-sulfur analyzer: EMIA-810W (trade name), manufactured by Horiba Ltd.).

In the positive electrode material for lithium ion secondary batteries according to the embodiment, a coating ratio of the carbonaceous film in the primary particles of the carbon-coated positive electrode active material is preferably 80% or more, more preferably 90% or more, and still more preferably 95% or more. When the coating ratio of the carbonaceous film in the primary particles of the carbon-coated positive electrode active material is 80% or more, the coating effect of the carbonaceous film can be sufficiently obtained.

The coating ratio of the carbonaceous film in the primary particles of the carbon-coated positive electrode active material is measured, for example, using a transmission electron microscope (TEM) or an energy dispersive X-ray microanalyzer (EDX).

The positive electrode material for lithium ion secondary batteries according to the embodiment may include a component other than the above-described granulated body. Examples of the component other than the granulated body include a binder formed of a binder resin and a conductive auxiliary agent such as carbon black, acetylene black, graphite, Ketjen black, natural graphite, or artificial graphite.

Olivine Type Positive Electrode Active Material

The olivine type positive electrode active material is formed of a compound represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

From the viewpoints of high discharge capacity and high energy density, it is preferable that the positive electrode active material satisfies $0.9<x<1.1$, $0<y\leq1$, $0\leq z<1$, and $0.9<y+z<1.1$ in $Li_xA_yD_zPO_4$.

From the viewpoint that a positive electrode mixture layer that can realize high discharge potential and high safety, Co, Mn, Ni, or Fe is preferable as A, and Mg, Ca, Sr, Ba, Ti, Zn, or Al is preferable as D.

The crystallite diameter of the olivine type positive electrode active material is preferably 30 nm or more and 300 nm or less and more preferably 50 nm or more and 250 nm or less. When the crystallite diameter of the olivine type positive electrode active material is less than 30 nm, a large amount of carbon is required to sufficiently coat the surface of the positive electrode active material with the pyrolytic carbonaceous film. In addition, since a large amount of the binder is required, the amount of the positive electrode active material in the positive electrode decreases, and the battery capacity may decrease. Likewise, the carbonaceous film may peel off due to an insufficient binding strength. On the other hand, when the crystallite diameter of the olivine type positive electrode active material is more than 300 nm, the internal resistance of the positive electrode active material excessively increases, and thus when a battery is formed, the discharge capacity at a high charge-discharge rate may decrease. In addition, when charge and discharge is repeated, an intermediate phase is likely to be formed, and a constituent element is eluted from the intermediate phase. As a result, the capacity decreases.

As a method of calculating the crystallite diameter of the olivine type positive electrode active material, the crystallite diameter can be determined by analyzing a powder X-ray diffraction pattern obtained by X-ray diffraction measurement using a Williamson-Hall method.

Carbonaceous Film

The carbonaceous film is a pyrolytic carbonaceous film that is obtained by carbonizing an organic compound as a raw material. It is preferable that the carbon source that is a raw material of the carbonaceous film is derived from an organic compound in which the purity of carbon is 40.00% or more and 60.00% or less.

In the positive electrode material for lithium ion secondary batteries according to the embodiment, as a method of calculating "purity of carbon" in the carbon source that is a raw material of the carbonaceous film, when plural kinds of organic compounds are used, a method of calculating and adding the amounts of carbon (% by mass) in the mixing amounts of the respective organic compounds based on the mixing amounts (% by mass) of the respective organic compounds and the known purities (%) of carbon and calculating the "purity of carbon" in the carbon source from the following Formula (1) based on the total mixing amount (% by mass) and the total amount of carbon (% by mass) of the organic compounds is used.

$$\text{Purity of Carbon (\%)}=\text{Total amount of Carbon (\% by mass)}/\text{Total Mixing Amount (\% by mass)}\times 100 \quad (1)$$

That is, the positive electrode material for lithium ion secondary batteries according to the embodiment is a mixture of the carbon-coated positive electrode active material and the metal adsorbent-carrying carbon material according to the embodiment. Therefore, in a case where the metal adsorbent-carrying carbon material is used in the positive electrode, iron ions eluted from a positive electrode material can be suppressed from being deposited on a negative electrode surface without inhibiting transfer of electrons and lithium ions.

Method of Producing Positive Electrode Material for Lithium Ion Secondary Batteries A method of producing the positive electrode material for lithium ion secondary batteries according to the embodiment is not particularly limited, and examples thereof include a method including: a step of preparing a dispersion by mixing $Li_xA_yD_zPO_4$ particles, the metal adsorbent-carrying carbon material according to the embodiment, and the organic compound with each other and dispersing the mixture; a step of obtaining a dry material by drying the dispersion; a step of calcinating the dry material in a non-oxidative atmosphere to obtain a granulated body obtained by granulating the primary particles of the carbon-coated electrode active material.

The $Li_xA_yD_zPO_4$ particles are not particularly limited and are preferably obtained using, for example, a method including: introducing a Li source, an A source, a D source, and a $PO_4$ source into water such that a molar ratio x:y+z thereof is 1:1; stirring the components to obtain a $Li_xA_yD_zPO_4$ precursor solution; stirring and mixing the precursor solution at 15° C. or higher and 70° C. or lower for 1 hour or longer and 20 hours or shorter to prepare a hydration precursor solution; putting this hydration precursor solution into a pressure resistant vessel; and performing a hydrothermal treatment at a high temperature and a high pressure, for example, at 130° C. or higher and 190° C. or lower and 0.2 MPa or higher for 1 hour or longer and 20 hours or shorter.

In this case, by adjusting the temperature and the time during the stirring of the hydration precursor solution and the temperature, the pressure, and the time during the hydrothermal treatment, the particle diameter of the $Li_xA_yD_zPO_4$ particles can be controlled to be a desired diameter.

In this case, as the Li source, for example, at least one selected from the group consisting of a lithium inorganic acid salt such as lithium hydroxide (LiOH), lithium carbonate ($Li_2CO_3$), lithium chloride (LiCl), or lithium phosphate ($Li_3PO_4$) and a lithium organic acid salt such as lithium acetate ($LiCH_3COO$) or lithium oxalate (($COOLi)_2$) is suitably used.

Among these, lithium chloride or lithium acetate is preferable from the viewpoint of obtaining a uniform solution phase.

As the A source, at least one selected from the group consisting of a Co source formed of a cobalt compound, a Mn source formed of a manganese compound, a Ni source formed of a nickel compound, a Fe source formed of an iron compound, a Cu source formed of a copper compound, and a Cr source formed of a chromium compound is preferable.

In addition, as the D source, at least one selected from the group consisting of a Mg source formed of a magnesium compound, a Ca source formed of a calcium compound, a Sr source formed of a strontium compound, a Ba source formed of a barium compound, a Ti source formed of a titanium compound, a Zn source formed of a zinc compound, a B source formed of a boron compound, an Al source formed of an aluminum compound, a Ga source formed of a gallium compound, an In source formed of an indium compound, a Si source formed of a silicon compound, a Ge source formed of a germanium compound, a Sc source formed of a scandium compound, and a Y source formed of a yttrium compound is preferable.

As the $PO_4$ source, for example, at least one selected from the group consisting of phosphoric acids such as orthophosphoric acid ($H_3PO_4$) or metaphosphoric acid ($HPO_3$), ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$), and hydrates thereof is preferable.

In particular, orthophosphoric acid is preferable from the viewpoint of easily forming a uniform solution phase.

In the method of producing the positive electrode material for lithium ion secondary batteries according to the embodiment, a mixing ratio between $Li_xA_yD_zPO_4$ particles and the metal adsorbent-carrying carbon material according to the embodiment is preferably 100:0.1 to 100:5 and more preferably 100:0.2 to 100:3 by mass ratio.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyols.

Examples of the polyols include polyethylene glycol, polypropylene glycol, polyglycerin, and glycerin.

The organic compound may be mixed such that the carbon content in the organic compound is 1 part by mass or more and 10 parts by mass or less with respect to 100 parts by mass of $Li_xA_yD_zPO_4$ particles or the total mass of $Li_xA_yD_zPO_4$ particles and the metal adsorbent-carrying carbon material.

Next, the obtained mixed liquid is dispersed to obtain a dispersion.

A dispersion method is not particularly limited and it is preferable to use a device capable of disentangling the agglomerated state of the $Li_xA_yD_zPO_4$ particles and the metal adsorbent-carrying carbon material. Examples of the disperser include a ball mill, a sand mill, and a planetary mixer. In particular, by using a continuous disperser, sampling can be performed during the dispersion, and an end point can be easily determined using a span value.

Next, the dispersion is dried to obtain a dry material.

In this step, a drying method is not particularly limited as long as a solvent (water) can be removed from the dispersion.

In order to prepare agglomerated particles, the dispersion is dried using a spray drying method. For example, a method of spraying and drying the dispersion in a high temperature atmosphere at 100° C. or higher and 300° C. or lower to obtain a particulate dry material or a granular dry material can be used.

Next, the dry material is calcinated in a non-oxidative atmosphere in a temperature range of 700° C. or higher and 1000° C. or lower and preferably 800° C. or higher and 900° C. or lower.

As the non-oxidative atmosphere, an inert atmosphere such as nitrogen ($N_2$) or argon (Ar) is preferable, and when it is desired to further suppress oxidation, a reducing atmosphere including reducing gas such as hydrogen ($H_2$) is preferable.

Here, the reason why the calcination temperature of the dry material is 700° C. or higher and 1000° C. or lower is that, it is not preferable that the calcination temperature is lower than 700° C. because the decomposition reaction of the organic compound included in the dry material do not sufficiently progress, the carbonization of the organic compound is insufficient, and the produced decomposition reaction product is a high-resistance organic decomposition product. On the other hand, when the calcination temperature is higher than 1000° C., a component constituting the dry material, for example, lithium (Li) is evaporated such that the composition deviates, grain growth in the dry material is promoted, the discharge capacity at a high charge-discharge rate decreases, and it is difficult to realize sufficient charge and discharge rate performance. In addition, impurities are produced, and these impurities cause deterioration in capacity when charge and discharge is repeated.

The calcination time is not particularly limited as long as the organic compound can be sufficiently carbonized. For example, the calcination time is 0.1 hours or longer and 10 hours or shorter.

Through the calcination, a granulated body that is produced using the primary particles of the carbon-coated electrode active material can be obtained. The obtained granulated body is the positive electrode material for lithium ion secondary batteries according to the embodiment.

Positive Electrode for Lithium Ion Secondary Batteries

The positive electrode for lithium ion secondary batteries according to the embodiment includes: an electrode current collector; and a positive electrode mixture layer (electrode) that is formed on the electrode current collector, in which the positive electrode mixture layer includes is the positive electrode material for lithium ion secondary batteries according to the embodiment.

That is, in the positive electrode for lithium ion secondary batteries according to the embodiment, the positive electrode mixture layer is formed on one main surface of the electrode current collector using the positive electrode material for lithium ion secondary batteries according to the embodiment.

A method of producing the positive electrode for lithium ion secondary batteries according to the embodiment is not particularly limited as long as the positive electrode mixture layer can be formed on one main surface of the electrode current collector using the positive electrode material for lithium ion secondary batteries according to the embodiment. Examples of the method of producing the positive electrode for lithium ion secondary batteries according to the embodiment include the following method.

First, the positive electrode material for lithium ion secondary batteries according to the embodiment, a binder, a conductive auxiliary agent, and a solvent are mixed with each other to prepare a positive electrode material paste for lithium ion secondary batteries.

Binder

As the binder, that is, as a binder resin, for example, a polytetrafluoroethylene (PTFE) resin, a polyvinylidene fluoride (PVdF) resin, or a fluororubber is suitably used.

When the total mass of the positive electrode material for lithium ion secondary batteries according to the embodiment, the binder, and the conductive auxiliary agent is represented by 100% by mass, the content rate of the binder in the positive electrode material paste for lithium ion secondary batteries is preferably 1% by mass or more and 10% by mass or less and more preferably 2% by mass or more and 6% by mass or less.

Conductive Auxiliary Agent

The conductive auxiliary agent is not particularly limited, and for example, at least one selected from the group consisting of acetylene black, Ketjen black, Furnace black, and filamentous carbon such as vapor-grown carbon fiber (VGCF) or carbon nanotube is used.

When the total mass of the positive electrode material for lithium ion secondary batteries according to the embodiment, the binder, and the conductive auxiliary agent is represented by 100% by mass, the content rate of the conductive auxiliary agent in the positive electrode material paste for lithium ion secondary batteries is preferably 1% by mass or more and 15% by mass or less and more preferably 3% by mass or more and 10% by mass or less.

Solvent

The solvent may be appropriately added to the positive electrode material paste for lithium ion secondary batteries including the positive electrode material for lithium ion secondary batteries according to the embodiment so as to easily coat a coating object such as the electrode current collector with the paste.

The solvent used for forming the positive electrode material paste for lithium ion secondary batteries may be appropriately selected depending on the characteristics of the binder resin.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethylformamide, N,N-dimethylacetoacetamide, and N-methylpyrrolidone; and glycols such as ethylene glycol, diethylene glycol, and propylene glycol. Among these solvents, one kind may be used alone, or a mixture of two or more kinds may be used.

When the total mass of the positive electrode material for lithium ion secondary batteries according to the embodiment, the binder, and the solvent is represented by 100 parts by mass, the content rate of the solvent in the positive electrode material paste for lithium ion secondary batteries is preferably 60 parts by mass or more and 400 parts by mass or less and more preferably 80 parts by mass or more and 300 parts by mass or less.

By controlling the content of the solvent to be in the above-described range, the positive electrode material paste for lithium ion secondary batteries having good electrode formability and good battery characteristics can be obtained.

A method of mixing the positive electrode material for lithium ion secondary batteries according to the embodiment, the binder, the conductive auxiliary agent, and the solvent with each other is not particularly limited as long as it is a method capable of uniformly mixing the components. For example, a method of using a kneader such as a ball mill, a sand mill, a planetary mixer, a paint shaker, or a homogenizer can be used.

Next, one main surface of the electrode current collector is coated with the positive electrode material paste for lithium ion secondary batteries to form a film thereon, and this coating film is dried and compressed. As a result, the positive electrode for lithium ion secondary batteries in which the positive electrode mixture layer is formed on the main surface of the electrode current collector can be obtained.

The positive electrode for lithium ion secondary batteries according to the embodiment includes the positive electrode material for lithium ion secondary batteries according to the embodiment. Therefore, iron ions eluted from a positive electrode can be suppressed from being deposited on a negative electrode surface without inhibiting transfer of electrons and lithium ions.

Lithium Ion Secondary Battery

The lithium ion secondary battery according to the embodiment includes a positive electrode, a negative electrode, and a non-aqueous electrolyte, in which the positive electrode for lithium ion secondary batteries according to the embodiment is provided as the positive electrode.

In the lithium ion secondary battery according to the embodiment, the negative electrode, the non-aqueous electrolyte, the separator, and the like are not particularly limited.

The negative electrode can be formed of, for example, a negative electrode material such as metal Li, a carbon material, a Li alloy, or $Li_4Ti_5O_{12}$.

In addition, a solid electrolyte may be used instead of the non-aqueous electrolyte and the separator.

The non-aqueous electrolyte can be prepared by mixing ethylene carbonate (EC) and ethyl methyl carbonate (EMC) with each other at a volume ratio of 1:1 to obtain a mixed solvent, and dissolving lithium hexafluorophosphate ($LiPF_6$) in the obtained mixed solvent such that the concentration thereof is, for example, 1 mol/dm$^3$.

As the separator, for example, porous propylene can be used.

The lithium ion secondary battery according to the embodiment includes the positive electrode for lithium ion secondary batteries according to the embodiment. Therefore, iron ions eluted from a positive electrode can be suppressed from being deposited on a negative electrode surface without inhibiting transfer of electrons and lithium ions.

EXAMPLES

Hereinafter, the present invention will be described in detail using Examples and Comparative Examples, but is not limited to the following examples.

Example 1

Preparation of Metal Adsorbent-Carrying Carbon Material

Surface Activation Treatment of Carbon Material 10 mL of sulfuric acid was slowly added to 20 mL of nitric acid, the obtained mixture was cooled to room temperature (25° C.), and the cooled mixture was dissolved in 3 g of potassium permanganate to prepare a surface treatment solution.

12 g of conductive carbon black particles (average primary particle diameter: 48 nm, trade name: DENKA BLACK HS-100, manufactured by Denka Co., Ltd.) were dipped in 120 g of the surface treatment solution and were kept at room temperature (25° C.) for 3 hours.

Next, 100 g of pure water was added to 132 g of the surface treatment solution including the carbon black particles, and the solution was left to stand for 3 hours.

Further, a hydrogen peroxide solution was added to the surface treatment solution until the surface treatment solution was transparent and bubbles were not formed.

After the bubbles were not formed, the carbon black particles in the surface treatment solution was filtered, and the collected carbon black particles were cleaned with pure water.

Next, the cleaned carbon black particles were dipped in an aqueous solution in which 0.5 g of sodium borohydride was dissolved in 0.1 mol/L of a sodium hydroxide aqueous solution, and a heat treatment was performed at 90° C. for 3 hours.

Next, the carbon black particles in the aqueous solution were filtered and were cleaned with pure water to obtain the carbon black particles on which the surface activation treatment was performed.

Supporting of Metal Adsorbent on Carbon Material 12 g of the carbon black particles on which the surface activation treatment was performed was mixed with an iron (III) nitrate aqueous solution in which iron (III) nitrate nonahydrate was dissolved in pure water. As a result, a suspension was prepared. The content of the iron (III) nitrate nonahydrate dissolved in pure water was 0.1 mol % in terms of Fe.

Next, a sodium hydroxide aqueous solution was added to the suspension under stirring to neutralize the suspension. The concentration of the sodium hydroxide aqueous solution was 5 mol/L.

Next, a heat treatment was performed on the neutralized suspension at 60° C. for 72 hours.

Next, the carbon black particles in the suspension were filtered, the collected carbon black particles were cleaned with pure water, and the cleaned carbon black particles were dried at 100° C. for 12 hours. As a result, the carbon black particles on which iron oxyhydroxide was supported was obtained.

Preparation of Carbon-Coated Positive Electrode Active Material

LiOH was used as a Li source, $NH_4H_2PO_4$ was used a P source, a $FeSO_4 \cdot 7H_2O$ was used as a Fe source, and the Li source, the P source, and the Fe source were mixed with each other in pure water such that a molar ratio Li:Fe:P between Li, Fe, and P was 3:1:1. As a result, 200 mL of a uniform slurry mixture was prepared.

Next, this mixture was put into a pressure resistant vessel.

Next, the mixture was heated at 170° C. for 12 hours to perform a hydrothermal synthesis. At this time, the internal pressure of the pressure resistant vessel was 1.3 MPa.

After the reaction, the atmosphere in a heat-resistant vessel was cooled to room temperature (25° C.) to obtain a cake-like precipitate of a reaction product.

This precipitate was sufficiently cleaned with distilled water multiple times, and the water content was maintained at 30% to prevent drying. As a result, a cake-like material was obtained.

This cake-like material was dried in a vacuum at 70° C. for 2 hours, and the obtained powder was analyzed by X-ray diffraction. As a result, it was verified that single-phase $LiFePO_4$ was formed.

20 g of the obtained $LiFePO_4$ (positive electrode active material) and 0.73 g of sucrose as a carbon source were mixed with each other in pure water such that the total amount was 100 g. The mixture was dispersed using a bead mill together with 150 g of zirconia beads having a diameter of 0.1 mm to prepare a slurry (mixture) having a dispersed particle diameter (d50) of 100 nm.

Next, the mixture was dried using a spray dryer such that the drying outlet temperature was 60° C. As a result, granulated powder was obtained.

Next, a heat treatment was performed on the granulated powder using a tube furnace at 750° C. for 2 hours to obtain a carbon-coated positive electrode active material.

Preparation of Positive Electrode Material Past for Lithium Ion Secondary Battery[0164]

The aforementioned carbon-coated positive electrode active material, polyvinylidene fluoride (PVdF) resin as a binder, conductive carbon as a conductive auxiliary agent (carbon black, average primary particle diameter: 48 nm, trade name: HS-100, manufactured by Denka Co., Ltd.) were added to N-methyl-pyrrolidinone (NMP) so that amass ratio (carbon-coated positive electrode active material:binder:conductive carbon) was set to 90:5:5 to forma mixture. Then, the aforementioned carbon black particles on which the iron oxyhydroxide was supported were added to the mixture to generate a positive electrode material past for lithium ion secondary batteries. The amount of the carbon black particles on which the iron oxyhydroxide has been supported was set to 30 part by mass with respect to 100 part by mas of the conductive carbon.

Preparation of Lithium Ion Secondary Battery[0165]

The obtained positive electrode material past for lithium ion secondary batteries was applied to an aluminum foil having a thickness of 30 μm, was dried, and was pressed to obtain a predetermined density. As a result, an electrode plate was obtained.

The obtained electrode plate was punched in a plate shape including a 3×3 cm² coated surface and a space for tabs, and the tabs were welded to prepare a test electrode.

On the other hand, as a counter electrode, a coated electrode that was also coated with natural graphite was used.

As a separator, a porous polypropylene membrane was adopted.

In addition, as a non-aqueous electrolyte (non-aqueous electrolytic solution), a 1 mol/L lithium hexafluorophosphate ($LiPF_6$) solution was used. As a solvent used in this $LiPF_6$ solution, a solvent obtained by mixing ethylene carbonate and diethyl carbonate at a volume percentage of 1:1 and adding 2% of vinylene carbonate as an additive was used.

Using the test electrode, the counter electrode, and the non-aqueous electrolyte prepared as described above, a laminated cell was prepared and was set as a battery according to Example 1.

Example 2

A lithium ion secondary battery according to Example 2 was prepared using the same method as that of Example 1, except that a suspension was prepared using an iron (III) nitrate aqueous solution in which the content of the iron (III) nitrate nonahydrate dissolved in pure water was 10 mol % in terms of Fe.

Example 3

12 g of a carbon nanotube (diameter: less than 8 nm, length: 5 μm to 20 μm, trade name: 0550CA-OH, manufactured by Corefront Corporation) on which the surface activation treatment was performed was mixed with an iron (III) nitrate aqueous solution in which iron (III) nitrate nonahydrate is dissolved in pure water. As a result, a suspension is prepared. The content of the iron (III) nitrate nonahydrate dissolved in pure water was 0.1 mol % in terms of Fe.

Next, a sodium hydroxide aqueous solution was added to the suspension under stirring to neutralize the suspension. The concentration of the sodium hydroxide aqueous solution was 5 mol/L.

Next, a heat treatment was performed on the neutralized suspension at 60° C. for 72 hours.

Next, the carbon nanotube in the suspension was filtered, the collected carbon nanotube was cleaned with pure water, and the cleaned carbon nanotube was dried at 100° C. for 12 hours. As a result, the carbon nanotube on which iron oxyhydroxide was supported was obtained.

A lithium ion secondary battery according to Example 3 was prepared using the same method as that of Example 1, except that the addition amount of the obtained carbon nanotube on which iron oxyhydroxide was supported was 30 parts by mass with respect to 100 parts by mass of the conductive carbon.

Example 4

A lithium ion secondary battery according to Example 4 was prepared using the same method as that of Example 3, except that a suspension was prepared using an iron (III) nitrate aqueous solution in which the content of the iron (III) nitrate nonahydrate dissolved in pure water was 5 mol % in terms of Fe.

Example 5

12 g of activated carbon (diameter (mesh): 3 μm or less, trade name: UCG-CPS, manufactured by UES Co., Ltd.) on which the surface activation treatment was performed was mixed with an iron (III) nitrate aqueous solution in which iron (III) nitrate nonahydrate was dissolved in pure water. As a result, a suspension was prepared. The content of the iron (III) nitrate nonahydrate dissolved in pure water was 0.1 mol % in terms of Fe.

Next, a sodium hydroxide aqueous solution was added to the suspension under stirring to neutralize the suspension. The concentration of the sodium hydroxide aqueous solution was 5 mol/L.

Next, a heat treatment was performed on the neutralized suspension at 60° C. for 72 hours.

Next, the activated carbon in the suspension was filtered, the collected activated carbon was cleaned with pure water, and the cleaned activated carbon was dried at 100° C. for 12 hours. As a result, the activated carbon on which iron oxyhydroxide was supported was obtained.

A lithium ion secondary battery according to Example 5 was prepared using the same method as that of Example 1, except that the addition amount of the obtained activated carbon on which iron oxyhydroxide was supported was 30 parts by mass with respect to 100 parts by mass of the conductive carbon.

Example 6

A lithium ion secondary battery according to Example 6 was prepared using the same method as that of Example 5, except that a suspension was prepared using an iron (III) nitrate aqueous solution in which the content of the iron (III) nitrate nonahydrate dissolved in pure water was 3 mol % in terms of Fe.

Example 7

A lithium ion secondary battery according to Example 7 was prepared using the same method as that of Example 1, except that the addition amount of the obtained carbon black particles on which iron oxyhydroxide was supported was 50 parts by mass with respect to 100 parts by mass of the conductive carbon.

Example 8

A lithium ion secondary battery according to Example 8 was prepared using the same method as that of Example 5, except that the addition amount of the obtained activated carbon on which iron oxyhydroxide was supported was 10 parts by mass with respect to 100 parts by mass of the conductive carbon.

COMPARATIVE EXAMPLE

A lithium ion secondary battery according to Comparative Example was prepared using the same method as that of Example 1, except that the carbon black particles on which iron oxyhydroxide was supported were not added.

Evaluation of Lithium Ion Secondary Battery

Regarding each of the lithium ion secondary batteries obtained in Examples 1 to 8 and Comparative Example, a capacity retention in a cycle test was measured using the following method.

The cut-off voltage was set as 2.5V-3.7V (vs carbon negative electrode).

The discharge capacity during constant-current charging and discharging was measured at an environmental temperature of 25° C., a charge current of 2 C, and a discharge current of 2 C, and the measured value was set as an initial discharge capacity.

Next, the environmental temperature was set to 45° C., and constant-current charging and discharging was performed at 600 times at a charge current of 2 C and a discharge current of 2 C. Next, the discharge capacity during constant-current charging and discharging was measured again at an environmental temperature of 25° C., a charge current of 2 C, and a discharge current of 2 C, and the measured value was obtained as a discharge capacity after cycles.

The capacity retention in the cycle test was calculated from "Cycle Test Capacity Retention (%)=(Discharge Capacity after Cycles)/(Initial Discharge Capacity)×100".

A case where the capacity retention after performing constant-current charging and discharging 600 times was 75% or more was evaluated as "Good", and a case where the capacity retention after performing constant-current charging and discharging 600 times was 74% or less was evaluated as "Bad".

The results are shown in Table 1.

TABLE 1

| | Carbon Material | Size | Addition Amount of Iron Oxyhydroxide [mol %] | Addition Amount of Metal Adsorbent-Carrying Carbon Material with respect to 100 Parts By Mass of Conductive Carbon [Part(s) by Mass] | Capacity Retention in Cycle Test [%] | Evaluation |
|---|---|---|---|---|---|---|
| Example 1 | Carbon Black Particles | Average Primary Particle Diameter: 48 nm | 0.1 | 30 | 80 | Good |
| Example 2 | Carbon Black Particles | Average Primary Particle Diameter: 48 nm | 10 | 30 | 83 | Good |
| Example 3 | Carbon Nanotube | Diameter: less than 8 nm Length: 5 μm to 20 μm | 0.1 | 30 | 78 | Good |
| Example 4 | Carbon Nanotube | Diameter: less than 8 nm Length: 5 μm to 20 μm | 5 | 30 | 81 | Good |
| Example 5 | Activated Carbon | Diameter: 3 μm or less | 0.1 | 30 | 82 | Good |
| Example 6 | Activated Carbon | Diameter: 3 μm or less | 3 | 30 | 85 | Good |
| Example 7 | Carbon Black Particles | Average Primary Particle Diameter: 48 nm | 3 | 50 | 81 | Good |
| Example 8 | Activated Carbon | Diameter: 3 μm or less | 1 | 10 | 87 | Good |
| Comparative Example | Not Added | — | — | 0 | 65 | Bad |

It was found from the results of Table 1 that, in the lithium ion secondary batteries according to Examples 1 to 8 including the positive electrode prepared using the positive electrode material including the carbon material (the carbon black particles, the carbon nanotube, or the activated carbon) on which iron oxyhydroxide was supported, the capacity retention after performing constant-current charging and discharging 600 times was 75% or more.

On the other hand, it was found that, in the lithium ion secondary battery according to Comparative Example including the positive electrode prepared using the positive electrode material not including the carbon material on which iron oxyhydroxide was supported, the capacity retention after performing constant-current charging and discharging 600 times was 65%, which was insufficient.

The metal adsorbent-carrying carbon material according to the present invention includes: a carbon material; and a metal adsorbent that is supported on the carbon material. Therefore, iron ions eluted from a positive electrode material can be suppressed from being deposited on a negative electrode surface without inhibiting transfer of electrons and lithium ions. Thus, the metal adsorbent-carrying carbon material is applicable to the next-generation secondary battery in which high voltage, high energy density, high load characteristics, and high-speed charge and discharge characteristics are expected. In the case of the next-generation secondary battery, the effects are significant.

The invention claimed is:

1. A positive electrode material for lithium ion secondary batteries comprising:
   an olivine type positive electrode active material which includes Fe and is coated with a carbonaceous film; and
   a metal adsorbent-carrying carbon material for a positive electrode for lithium ion secondary batteries wherein the metal adsorbent-carrying carbon material comprises
   a carbon material; and
   a metal adsorbent supported on the carbon material, wherein the metal adsorbent is a material which can adsorb iron ions ($Fe^{2+}$, $Fe^{3+}$).

2. The positive electrode material according to claim 1, wherein the carbon material is at least one selected from the group consisting of carbon black, carbon nanotube, and activated carbon.

3. The positive electrode material according to claim 1, wherein the metal adsorbent is at least one selected from a group consisting of iron oxyhydroxide, iron hydroxide, and calcium phosphate.

4. A positive electrode for lithium ion secondary batteries comprising:
   an electrode current collector; and
   a positive electrode mixture layer which is formed on the electrode current collector,
   wherein the positive electrode mixture layer includes the positive electrode material for lithium ion secondary batteries according to claim 1.

5. A lithium ion secondary battery comprising:
   a positive electrode;
   a negative electrode; and
   a non-aqueous electrolyte,
   wherein the positive electrode for lithium ion secondary batteries according to claim 4 is provided as the positive electrode.

* * * * *